(12) United States Patent
Rice

(10) Patent No.: US 11,816,308 B2
(45) Date of Patent: Nov. 14, 2023

(54) WEB BROWSER TAB NAVIGATION DURING VIDEO CONFERENCE SESSION

(71) Applicant: Salesforce, Inc., San Francisco, CA (US)

(72) Inventor: Tori Jeannette Rice, Indianapolis, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/649,496

(22) Filed: Jan. 31, 2022

(65) Prior Publication Data

US 2022/0308716 A1    Sep. 29, 2022

Related U.S. Application Data

(60) Provisional application No. 63/166,425, filed on Mar. 26, 2021.

(51) Int. Cl.
| | |
|---|---|
| *H04L 65/403* | (2022.01) |
| *G06F 3/0484* | (2022.01) |
| *G06F 3/0483* | (2013.01) |
| *G06F 3/0482* | (2013.01) |
| *G06F 3/0489* | (2022.01) |

(52) U.S. Cl.
CPC .......... *G06F 3/0483* (2013.01); *G06F 3/0482* (2013.01); *G06F 3/0484* (2013.01); *G06F 3/04897* (2013.01); *H04L 65/403* (2013.01)

(58) Field of Classification Search
CPC .... G06F 3/0483; G06F 3/0482; G06F 3/0484; G06F 3/04897; G06F 3/0481; H04L 65/403; H04L 65/1089; H04L 65/4015
See application file for complete search history.

(56) References Cited

U.S. PATENT DOCUMENTS

| | | | | |
|---|---|---|---|---|
| 5,991,276 | A * | 11/1999 | Yamamoto | H04L 12/1827 370/260 |
| 9,529,487 | B1 * | 12/2016 | Bottner | G06F 3/0483 |
| 10,701,117 | B1 * | 6/2020 | Moskovits | H04N 7/147 |
| 2012/0209954 | A1 * | 8/2012 | Wright | H04L 67/141 709/217 |
| 2013/0311664 | A1 * | 11/2013 | Pirnazar | H04L 65/403 709/227 |
| 2014/0281983 | A1 * | 9/2014 | Xian | G06F 3/0484 715/716 |

(Continued)

*Primary Examiner* — Beau D Spratt
*Assistant Examiner* — Kuang F Chen
(74) *Attorney, Agent, or Firm* — Holland & Hart LLP

(57) ABSTRACT

Methods, systems, and devices supporting web browser tab navigation are described. A device (e.g., a user device) may initiate, via a web browser and in a first tab of a set of tabs of the web browser, a video conference session of a video conference application. The device may render a visual component in a user interface of the video conference session that indicates enablement of tab navigation functionality for the video conference application. In some examples, enablement of the tab navigation functionality may be based on an extension being installed in the web browser. The device may then receive an input via the visual component to visually distinguish the first tab for a duration of the video conference session, and cause for display a visual marker associated with the first tab for the duration of the video conference session based on receiving the input.

20 Claims, 12 Drawing Sheets

(56) References Cited

U.S. PATENT DOCUMENTS

2015/0310377 A1* 10/2015 Schlumberger ............................. G06Q 10/063114 705/7.15
2019/0258666 A1* 8/2019 Crimins .................. H04L 67/02
2021/0385683 A1* 12/2021 Boyapalle ......... H04W 28/0268

* cited by examiner

WEB BROWSER TAB NAVIGATION DURING VIDEO CONFERENCE SESSION

CROSS REFERENCES

The present Application for Patent claims priority to U.S. Provisional Patent Application No. 63/166,425 by Rice, entitled "WEB BROWSER TAB NAVIGATION DURING VIDEO CONFERENCE SESSION," filed Mar. 26, 2021, assigned to the assignee hereof and expressly incorporated by reference herein.

FIELD OF TECHNOLOGY

The present disclosure relates generally to database systems and data processing, and more specifically to web browser tab navigation during video conference session.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, a system may support video conferencing using a web browser-based application. Users may access the video conference application and different other applications and pages on different user devices. While participating in one application hosted in one browser tab, a user may switch tabs to search to retrieve other information from other browser tabs.

DETAILED DESCRIPTION

Figure 1:
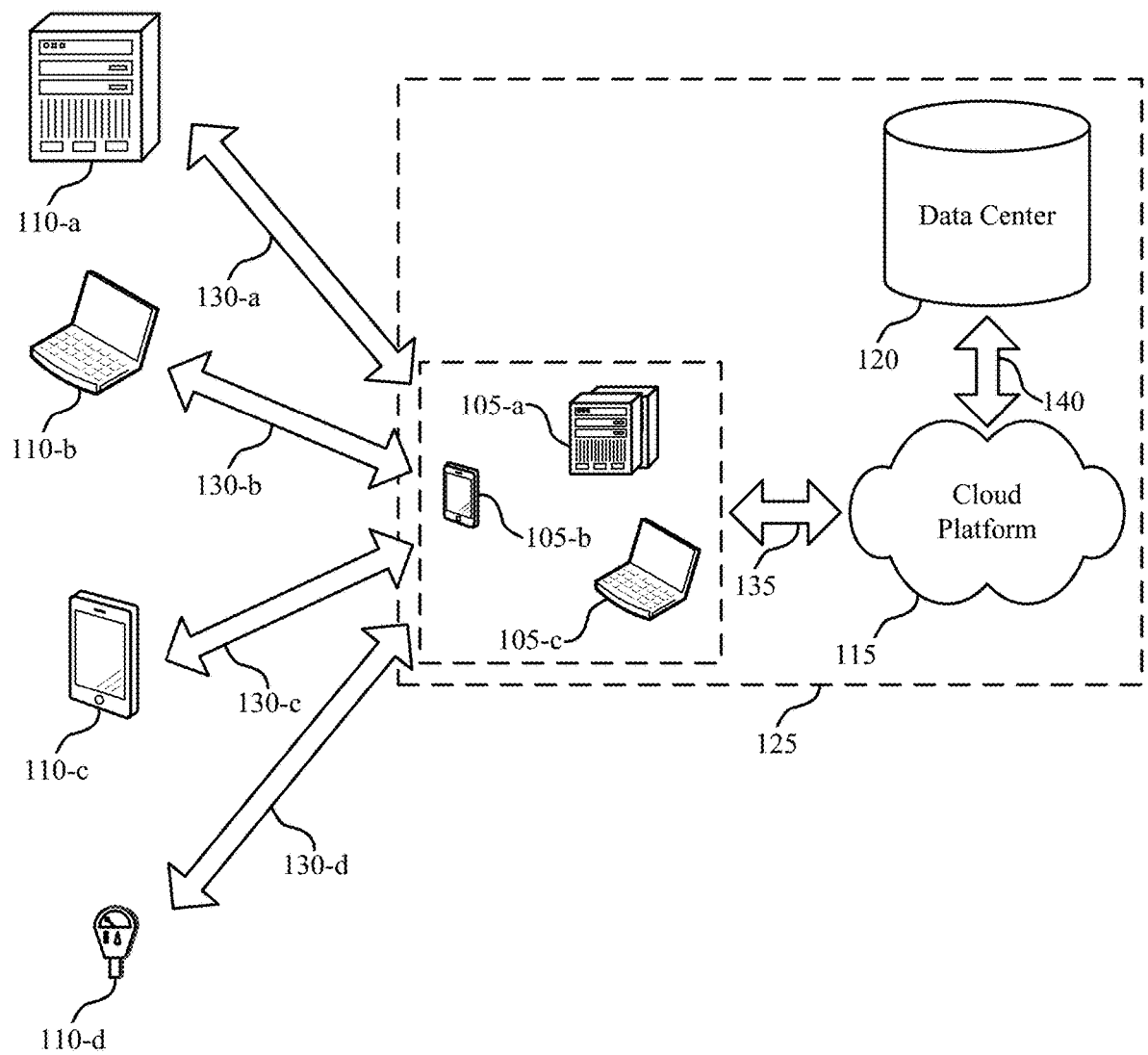
FIG. 1 illustrates an example of a web browser tab navigation system that supports web browser tab navigation during video conference session in accordance with aspects of the present disclosure.

A system may support video conferencing using a web browser-based application. While using a video conference application, a user may have multiple tabs of the web browser open simultaneously within a window. Additionally or alternatively, the user may have multiple windows of the web browser open simultaneously, where one of the windows include a tab displaying the video conference application. When a user is participating in virtual meetings via video conference applications, it may be difficult to keep track of the tab displaying the video conference application. For example, while participating in a video conference, a user may switch tabs to search for documents or to retrieve other information for sharing in the window hosting the video conference application. Many times, it may be time consuming to find the tab where the virtual meeting is being held. In cases where multiple windows are open, it may be time consuming to browse through several windows and tabs in order to return to the tab hosting the virtual meeting. This time away from the meeting can be awkward and may take away from the time of the meeting.

Various aspects of the present disclosure provide techniques for implementing web browser tab navigation during a video conference session. Techniques described herein may support methods to highlight a tab of interest, that may simultaneously be used by multiple users of a video conference application (e.g., multiple attendees of a video conference session). In particular, one or more aspects of the present disclosure provides for utilization of a plug-in or extension to highlight a tab during a video conference session. This plug-in or extension, when installed may provide a user with an ability to highlight (e.g., using a button) a tab hosting a video conference application, thereby making the tab visually stand out within multiple open tabs. According to one or more aspects, a plug-in may be installed in a user device. In some examples, a user may initiate a video conference session of a video conference application in a first tab and via a web browser. The first tab may be a tab of a set of tabs of the web browser.

The plug-in or extension, when installed, may render a visual component in a user interface of the video conference session that indicates enablement of tab navigation functionality for the video conference application. In some examples, enablement of the tab navigation functionality may be based on an extension for the video conference application being installed in the web browser. For instance, upon installation of the plug-in, a button may be rendered on the user interface including the video conference application. During an active video conference session, a user may select the button to highlight the video conference tab before leaving the video conference application. For example, the user device may receive an input via the visual component to visually distinguish the first tab from the set of tabs for a duration of the video conference session. Upon receiving the input from the user, one or more aspects of the present disclosure provides for methods to display a visual marker marking the tab as being associated with the video conference application. For instance, the device, upon receiving the user input via a button rendered upon installation of a plug-in, may cause for display a visual marker associated with the first tab for the duration of the video conference session.

In some examples, aspects depicted herein provides for a button in a virtual meeting (e.g., hosted via video conference) that will call back an attendee if someone (e.g., a different attendee) presses it. The device hosting the video conference application may receive a second input via the visual component to visually distinguish a second tab from a second set of tabs. In some examples, the second set of tabs may correspond to a web browser of a second attendee of the video conference session (e.g., a second attendee using a second user device). The user device may transmit a request to the web browser of the second attendee to visually distinguish the second tab from the second set of tabs for the duration of the video conference session based on receiving the second input. For example, if a first user and a second user were in a meeting together, and the first tab hosting the meeting, then the second user may be able to select a button located on the video conference application displayed at the device of the second user. After receiving selection of the button located on the video conference application displayed at the device of the second user, the tab hosting the video conference application at the device of the first user may be highlighted.

Aspects of the disclosure are initially described in the context of an environment supporting an on-demand database service. Aspects of the disclosure are further described with respect to a general system diagram that shows computing components and data flows that support web browser tab navigation during video conference session and diagrams illustrating user interfaces that support the techniques herein. Aspects of the disclosure are further illustrated by and described with reference to apparatus diagrams, system diagrams, and flowcharts that relate to web browser tab navigation during video conference session.

FIG. 1 illustrates an example of a system 100 for cloud computing that supports web browser tab navigation during video conference session in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The data center 120 may be an example of a multi-tenant system that supports data storage, retrieval, data analytics, and the like for various tenants, such as the cloud clients 105. As such, each cloud client 105 may be provided with a database instance in the data center 120, and each database instance may store various datasets that are associated with the particular cloud client 105. More particularly, each cloud client 105 may have a specific set of datasets that are unique for the cloud client 105. In addition, the cloud platform and the data center 120 support various applications (e.g., video conference applications). Additionally or alternatively, the subsystem 125 may support a number of applications, data management, messaging, or any other supported functionality. These applications, pages, and components may support methods to highlight a tab by a user. A user may utilize a plug-in or an extension to highlight a tab during a video conference session such that the highlight is visible during a duration of an active video conference session. One or more aspects of the present disclosure may support methods to visually mark web browser tabs including an active video conference session as well as methods to visually mark web browser windows including an active video conference session in response to receiving an input from a participant of the video conference.

Conventional systems may support video conferencing using a web browser-based application. Often times, a user may have multiple tabs and/or multiple windows open simultaneously. When a user is participating in virtual meetings via video conference applications, a user may get lost in the open tabs and it may be difficult to find the tab including the active video conference session. That is, while participating in a video conference session, a user may switch tabs to retrieve information for sharing and it may be time consuming to find the tab where the virtual meeting is being held. Additionally, in cases where multiple windows are open, it may be time consuming to browse through several windows and tabs in order to return to the tab hosting the virtual meeting. In the such cases, a lack of methods for highlighting of a tab may result in a poor user experience.

In contrast, the subsystem 125 in combination with the contacts 110 may support a system that supports techniques for web browser tab navigation during a video conference session. The system 100 may also greatly improve the user experience at user devices running the application. An application supporting web browser tab navigation during video conference session may simultaneously be used by multiple users. In some examples, the system 100 may support a plug-in or an extension that when installed will provide a user with the ability to highlight (e.g., using a visual component such as a button) a tab hosting a video conference application, thereby making the tab visually stand out within multiple open tabs. In some examples, a web browser may render a visual component in a user interface of a video conference session of the video conference application that indicates enablement of tab navigation functionality for the video conference application. In some examples, enablement of the tab navigation functionality may be based on an extension for the video conference application being installed in the web browser. The web browser may receive an input via the visual component to visually distinguish the first tab from the set of tabs for a duration of the video conference session. For example, during an active video conference session, a user may select the button to highlight the tab including the video conference before leaving the tab. Upon receiving the input, the web browser may cause for display a visual marker associated with the first tab for the duration of the video conference session. Thus, one or more aspects of the present disclosure provide for methods to display a visual marker marking the tab as being associated with a video conference application.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
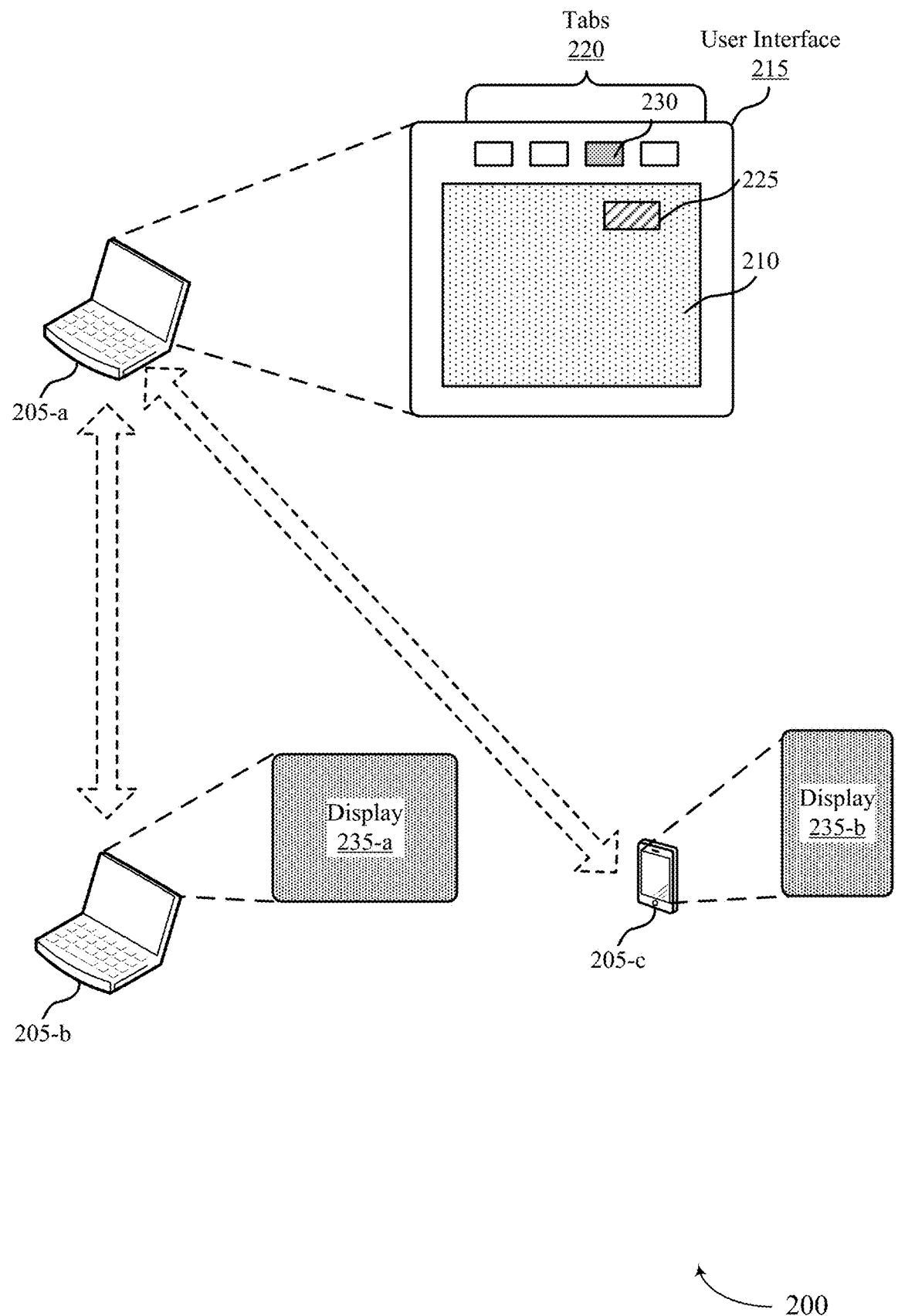
FIG. 2 illustrates an example of a system that supports web browser tab navigation during video conference session in accordance with aspects of the present disclosure.

FIG. 2 illustrates an example of a system 200 that supports web browser tab navigation during video conference session in accordance with aspects of the present disclosure. The system 200 may include a number of user devices 205, which may be examples of cloud clients 105 or contacts 110 as described with reference to FIG. 1. Although not shown in the example of FIG. 2, the system 200 may include a server which may be examples of aspects of the cloud platform 115 and the data center 120 of FIG. 1. The system 200 may be represent various devices and components that support an analytical data system as described herein. The system 200 may support a multi-tenant database system, which may manage various datasets that are associated with specific tenants (e.g., cloud clients 105).

A user (e.g., a user of a video conference application) may operate a first user device 205-*a* running a video conference application to implement web browser tab navigation. Using user device 205-*a* and the application, the user may input via a visual component 225 to highlight a tab 230 displaying a video conference session. In some examples, the visual component 225 may be displayed in different user interfaces 215. In some examples, the same application (e.g., supported by a single underlying metadata file or container) may be displayed differently on different user devices 205 corresponding to different user interface types. A user accessing an application (e.g., a video conference application) or a page displaying a video conference session on a user device 205-*b* (e.g., a laptop or desktop computer corresponding to a large form factor) may view a first display 235-*a*, while a user accessing the same application or page on a user device 205-*c* (e.g., a mobile phone corresponding to a small form factor) may view a second display 235-*b*. In some examples, the user accessing an application or page on a user device 205 may view or otherwise interact with the visual component 225 on a first view of an application (e.g., during active video conference session) via a display 235, and may subsequently view or otherwise interact with the visual component 225 on a second view of the application (e.g., prior to an initiation of the video conference session).

The system 200 may allow implementation of highlighting or otherwise displaying a visual marker associated with a web browser tab. That is, the system 200 may allow a user to highlight a tab displayed on different types of user interfaces rendered on user devices 205 (e.g., mobile phones, smartwatches, tablets, desktops, laptops, etc.). With custom tab highlighting support at a user devices 205 (e.g., including at a mobile device), the user device 205 may support switching between different tabs, where a first tab includes an active video conference session and a second tab includes additional information (e.g., websites unrelated to the video conference session). In addition, a user device 205 may display a video conference session 210 of a video conference application. A user interacting with the user device 205 may install a plug-in or an extension prior to or during the video conference session 210. Installation of the plug-in or the extension may render an overlaid window including a visual component 225 associated with enablement of tab navigation functionality for the video conference application. For example, upon launching a video conference session of a video conference application in a web browser, the video conference application may recognize that an extension or plug-in has been installed for the video application in the web browser. As such, the video application may interact with the extension or plug-in to enable additional functionality such as rendering a visual component 225 (e.g., a button) within the user interface of the video conference session that enables tab highlighting as well as other tab and window navigation functions as described herein. Furthermore, the user device 205 may support rendering a different user interface 215 that shows the video conference session 210 of the video conference application in a different view, but retains the tab highlighting functionality.

To support different renderings for different user interfaces on displays 235, the system 200 may include tab highlighting options for users across each user interface. For example, the system 200 may support a display of different plug-ins available for download and installation. In another example, the system 200 may support a display of installed plug-ins without displaying the plug-ins available for download and installation. For example, plug-ins may only be applicable (e.g., may be installed and downloaded) for one user interface 215, while other plug-ins may be applicable for other user interfaces 215 (based on user experience within a workplace). In some cases, plug-ins displayed on multiple user interfaces 215 may render differently in different user interfaces 215.

In some examples, a user interface type may refer to a type of device, a form factor, or some combination of these. In one specific example, at the code level, user interface types may be defined by form factors, while at the user interface level, the user interface types may be defined by device types. Different form factors may refer to different user interface sizes, such as "Small," "Medium," "Large," etc. Different device types may refer to different physical devices, such as mobile phones, smartwatches, tablets, desktops, laptops, etc. In some cases, certain form factors may be associated with certain device types. For example, a "Small" form factor and a mobile phone may be examples of equivalent user interface types. Similarly, a "Large" form factor may be equivalent to a desktop.

One or more aspects of the present disclosure may support rendering for multiple tabs 220, applications, pages, or some combination of these across different user interfaces 215. Various aspects of the present disclosure provide techniques for implementing web browser tab navigation during video conference session. As depicted in the example of FIG. 2, users may utilize the methods described herein to highlight a tab of interest. Additionally or alternatively, aspects depicted herein provide functionality to simultaneously highlight web browser tabs used by multiple users of a video conference application (e.g., multiple attendees of a video conference session). In some examples, a user may download and install a plug-in or extension to highlight a tab during a video conference session. The plug-in or extension may be downloaded and installed locally on each user device 205.

A plug-in may be a piece of software that manages content that a browser is not designed to process. In particular, browser plug-ins may provide for customization in a web browser. Web browsers may allow a variety of extensions, including user interface modifications. In some examples, a browser plug-in or extension includes a software code that when executed, provides a user with an ability to highlight (e.g., using a button) a tab hosting a video conference application, thereby making the tab visually stand out within multiple open tabs. As described herein, a plug-in may be installed in a user device 205 and may be specific to a particular web browser. A user operating the user device 205 may provide an indication to install the plug-in or an extension. For example, the user device 205-a may receive a request to download the extension for a video conference application. Upon receiving the request to download, the user device 205-a may install the extension for the video conference application in the web browser. Similarly, the user device 205-b and the user device 205-c may have the plug-in or the extension installed in their respective web browsers. The plug-in or extension, when installed, may render a visual component in a user interface of the video conference session that indicates enablement of tab navigation functionality for the video conference application.

An application launcher at a user device may indicate the applications or pages that are activated and available for the user device. In some cases, activating an application (e.g., a video application) or page may push the application or page to a centralized system or server (e.g., an applications server). Other user devices 205 may then access and display the activated application or page by interacting with the application server (e.g., via an API). In some cases, when operating online, running an application or page at a user device 205 may involve a link between the user device 205 and the application server storing information about the application or page (e.g., a template for video conferencing, comments in a window overlaid on the user interface 215, a messaging functionality associated with the video conferencing, etc.). In other cases, when operating offline, the user device 205 may store the information about the video conference application or page locally. In some examples, the user device 205 may initially download support for the application or page from an application server before running the application or page without requiring further interactions with the application server.

In some examples, a user may initiate a video conference session 210 of a video conference application in a first tab 230 and via a web browser. The first tab 230 may be a tab of a set of tabs 220 of the web browser. As depicted herein, a user operating the user device 205-a may provide an input via a visual component 225 enabled upon installation of the plug-in or the extension. Some visual components 225 that support rendering on multiple user interfaces 215 may render differently for different user interfaces 215. In a first example, a visual component 225 may be an example of a button. A button may be rendered in response to installation of an extension. In particular, a button can provide multiple options for tab highlighting during an active video conference session. In a second example, a visual component 225 may be an example of a window rendered in response to installation of an extension or plug-in in a web browser. In some examples, the visual component 225 may be adaptive to a type of user interface. For example, an adaptive visual component 225 may be displayed differently in different user interfaces 215. The input received by the system 200 and any number of additional inputs received via the visual component 225 may support rendering in any number of user interfaces 215. Thus, upon installation of a plug-in or an extension, a visual component 225 (e.g., a button) may be rendered on the user interface 215 including the video conference application.

During an active video conference session, a user may select the visual component 225 to display options for tab navigation functionality. In particular, the visual component 225 may indicate enablement of tab navigation functionality for the video conference application. A user may interact with the visual component 225 to highlight the tab including the active video conference session before leaving the video conference application. For example, the user device 205-*a* in the example of FIG. 2, may receive an input via the visual component 225 to visually distinguish the first tab 230 from a remaining number of tabs in the set of tabs 220. In some examples, the first tab 230 may remain visually distinguished for a duration of the video conference session or until otherwise indicated by the user.

Upon receiving the input from the user, one or more aspects of the present disclosure provides for methods to display a visual marker marking the first tab 230 to indicate that the first tab 230 is associated with the video conference application. In the example of FIG. 2, the user device 205-*a* may cause for display a visual marker associated with the first tab 230 for the duration of the video conference session. For example, the user interface 215 may display a button in an overlay including a virtual meeting (e.g., video conference). During an active video conference session, a user may provide an input via the displayed button (e.g., visual component 225) to visually distinguish the first tab 230 from the set of tabs 220 for a duration of the video conference session. For example, the user may provide a first input via the visual component 225 and the user device 205-*a* may render a list of actions. In some examples, the list of actions may include a first action for the user to highlight a tab at the user interface 215 and a second action for the user to highlight a second tab at a second user interface. The user may then select an action from the list of actions and the user device 205-*a* may highlight a tab or transmit a request for highlighting a tab upon receiving the input from the user.

The user devices 205 may provide for multiple ways for highlighting the first tab 230. For example, the user interface 215 may display an underline under the tab (e.g., first tab 230) displaying an active video conference session. In some examples, the user interface 215 may display a line over the tab (e.g., first tab 230) displaying the active video conference session. In some examples, the user interface 215 may display a rectangle around the tab (e.g., first tab 230) displaying the active video conference session. In some examples, the user interface 215 may change a color of the tab (e.g., first tab 230) displaying the active video conference session.

One or more aspects of the present disclosure provides for a button (e.g., visual component 225) in a virtual meeting (e.g., hosted via video conference) that will call back a second user if a first user presses the button. As depicted in the example of FIG. 2, a first user device 205-*a* may host the video conference application. The first user device 205-*a* may render the visual component 225 for a first user operating the first user device 205-*a*. The visual component 225 may render an option for the first user to highlight (or display a visual marker) a tab for a second user. In particular, the user device 205-*a* may receive a second input via the visual component 225 to visually distinguish a second tab from a second set of tabs (not shown). In some examples, the second set of tabs corresponds to a web browser of a second attendee of the video conference session. The web browser of the second attendee of the video conference session may be displayed on display 235-*a* of a second user device 205-*b*. Upon receiving the second input, the user device 205-*a* may transmit a request to the web browser (displayed on user device 205-*b*) of the second attendee to visually distinguish the second tab from the second set of tabs for the duration of the video conference session. In this way, a first user (e.g., of user device 205-*a*) can help a second user (e.g., of user device 205-*b*) find their way back to the tab that is actively hosting the video conference session on the second user's device by sending a request to the second user's device to highlight the active tab within the second user's device user interface. In some examples, the user device 205-*a* may transmit the request upon determining that the second user device 205-*b* is capable of highlighting a tab. For instance, the user device 205-*a* may receive a capability message from the web browser of the second attendee indicating a capability of the second web browser (displayed via display 235-*a*) to visually distinguish the second tab from the second set of tabs. In some examples, the capability of the second web browser may be based on the extension for the video conference application being installed in the second web browser on the second user device 205-*b*. Thus, if a first user (operating user device 205-*a*) and a second user (operating user device 205-*b*) were in a meeting together, then the first user may be able to select a button (e.g., visual component 225) located on the video conference application displayed at the user device 205-*a*. After receiving selection of the button located on the video conference application displayed at the user device 205-*a*, the tab hosting the video conference application at the user device 205-*b* may be highlighted.

One or more aspects of the present disclosure may provide for highlighting a web browser window. For example, the user devices 205 may further provide for highlighting options for a browser window including the video conference application in case there are multiple open browser windows at a user device 205. In some examples, the user device 205-*a* may display an active video conference session in a first tab 230. The first tab 230 may be visually rendered within a first window of a set of windows of the web browser included in the first tab 230. Upon receiving an input to visually distinguish the first tab 230 from the set of tabs 220 for the duration of the video conference session, the user device 205-*a* may display a second visual marker that visually distinguishes the first window from the set of windows of the web browser. The user device 205-*a* may display the second visual marker based on the first tab being visually rendered within the first window.

In some examples, the user device 205-*a* may determine that the video conference session of the video conference application has concluded. Upon determining that the video conference session of the video conference application has concluded, the user device 205-*a* may disable the visual marker associated with the first tab 230. Additionally or alternatively, the user device 205-*a* may render an indication of an option to disable an active visual marker associated with the first tab 230 for the duration of the video conference session. For example, the visual component 225 may display a list of actions, where an action may correspond to disabling the active visual marker. The user device 205-*a* may receive an input via the visual component 225 to disable the visual marker associated with the first tab 230. The user device 205-*a* may then disable the visual marker associated with the first tab 230 for a remaining duration of the video conference session based on receiving the second input. Thus, a button or button group (e.g., visual component 225) also be selected by a user before the user moves away from their tab such that the tab remains highlighted until indicated otherwise (e.g., the user turns off the highlight or the active video conference session ends). Additionally or alternatively, a user device 205-*a* may support receiving an input via a keyboard shortcut configured for the extension for the video conference application, such as a keyboard input to return to the first tab 230 from the set of tabs 220. The user device 205-*a* may then display the first tab 230 from the set of tabs 220 based on receiving the keyboard input. For instance, a user can press a configured key or combinations of keys on a keyboard while in one of the tabs 220, and the extension may be configured to automatically return the user to the tab 230 (or the window) hosting the video conference session.

The highlighting mechanism thus provides methods to visually mark tabs including an active video conference session as well as browser windows including an active video conference session in response to receiving an input from a participant of the video conference. Thus, one or more aspects of the present disclosure provides for users to find their way back to a tab hosting a virtual meeting.

Figure 3:
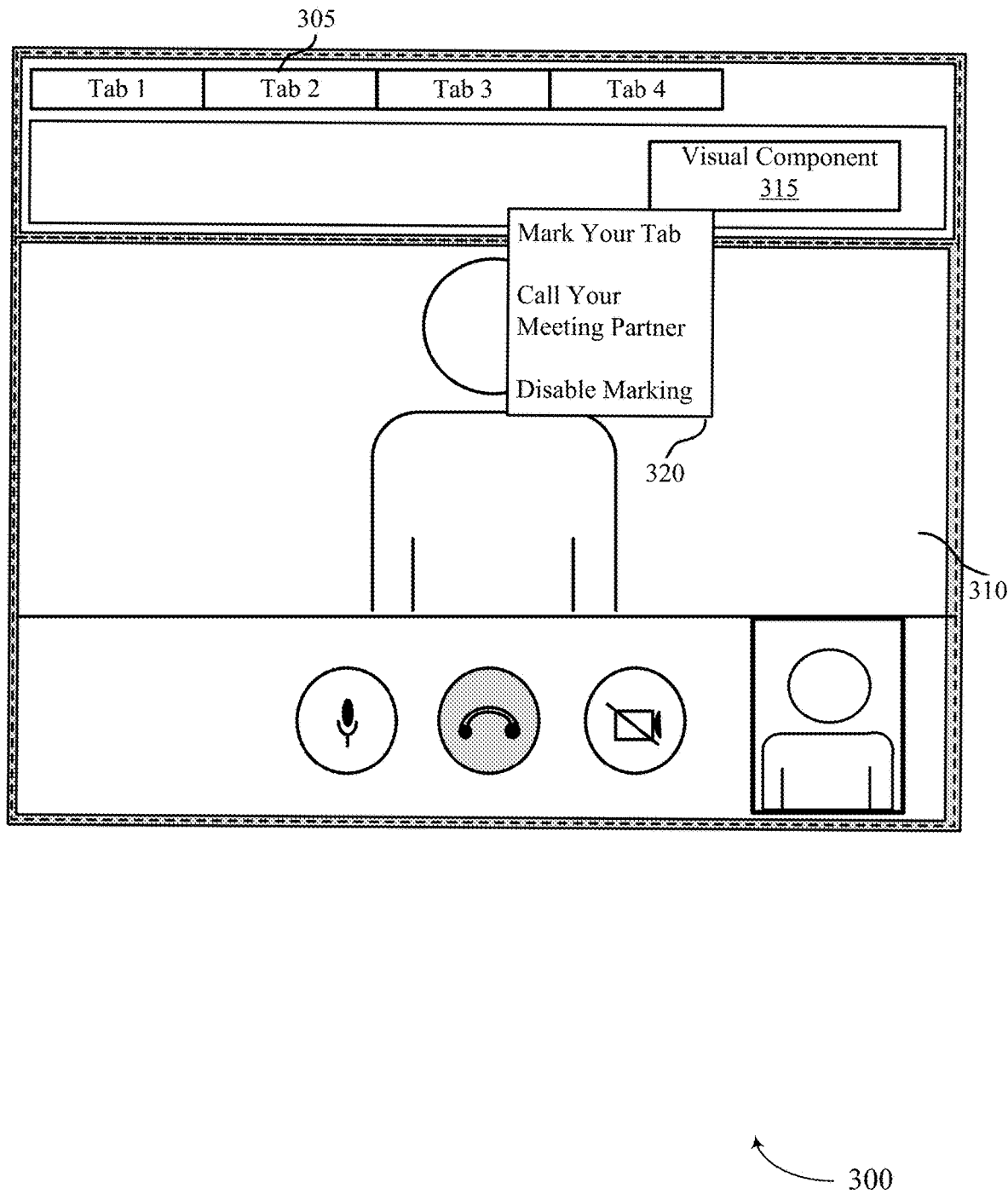
FIG. 3 illustrates an example of a user interface that supports web browser tab navigation during video conference session in accordance with aspects of the present disclosure.

FIG. 3 illustrates an example of a user interface 300 that supports web browser tab navigation during video conference session in accordance with aspects of the present disclosure. The user interface 300 may correspond to a desktop or mobile or other user interface type. In some cases, additional user interface types may be supported for implementing tab navigation during video conference session. The user interface 300 may support a view of a tab displaying an active video conference session.

As depicted herein, the user interface 300 may display a video conference session for a user of a user device. The user operating the user device may be associated with a user credential or user ID, and the user may log on to the user device using the user credential. In some cases, the user may also log on to a cloud-based application (e.g., a cloud-based video conference application) using a user credential. Although a single user device is described herein, it may be understood that multiple user devices may be able to simultaneously display the video conference application. In some examples, a server may transmit, to the user device, a cloud-based video conference application for display. In some cases, the user operating the user device may select to load an active video conference session of a video conference application.

As depicted in the example of FIG. 3, the user device may initiate, via a web browser and in a first tab 305 of a set of tabs of the web browser, a video conference session 310 of a video conference application. For example, the web browser may include "Tab 1," "Tab 2," "Tab 3," and "Tab 4." Out of the four open tabs, "Tab 3" (or first tab 305) may include an active video conference session. The web browser may render a visual component 315 in a user interface of the active video conference session 310. The visual component 315 may indicate enablement of tab navigation functionality for the video conference application. In some examples, enablement of the tab navigation functionality may be based on an extension for the video conference application being installed in the web browser. That is, the user interface via the web browser may receive a request to download the extension for the video conference application and upon receiving the request, the web browser may install the extension for the video conference application in the web browser.

The user interface 300 may receive an input via the visual component 315 to visually distinguish the first tab 305 from the set of tabs for a duration of the video conference session. For example, the user interface via the web browser may receive an input via the visual component 315. Upon receiving the input, the web browser may render a list 320 of actions. As depicted in the example of FIG. 3, the list 320 of actions may include a first action to mark a tab, a second action to call a meeting partner and a third action to disable marking. In one example, the user may provide an input via the first action to mark a tab (e.g., to mark the first tab 305). Upon receiving the input, the web browser may display a visual marker associated with the first tab 230 for the duration of the video conference session. Thus, a user may provide an input to mark a tab prior to leaving an active video conference session.

Additionally or alternatively, the user interface 300 may receive a second input via the visual component 315 to visually distinguish a second tab from a second set of tabs (not shown). In some examples, the second set of tabs may correspond to a web browser of a second attendee of the video conference session. For example, the user may provide an input via the second action to call a meeting partner (e.g., to mark a tab for a second attendee of the video conference application). Upon receiving the input, the user device may transmit a request to the web browser of the second attendee to visually distinguish the second tab from the second set of tabs for the duration of the video conference session. In some examples, the user device may receive a capability message from the web browser of the second attendee indicating a capability of the second web browser to visually distinguish the second tab from the second set of tabs. In some examples, the capability of the second web browser may be based on the extension for the video conference application being installed in the second web browser. In some examples, the visual component 315 may visually indicate the capability of the second web browser. For instance, the second action to call a meeting partner may be disabled (e.g., grayed out) if the user device including user interface 300 may determine that the user device of the meeting partner does not have the extension installed.

In some examples, user interface 300 may receive a second input via the visual component to disable the visual marker associated with the first tab 305. For example, the user may provide an input via the third action to disable marking (e.g., to disable marking of the first tab 305). Upon receiving the input, the user device may disable the visual marker associated with the first tab 305 for a remaining duration of the video conference session.

Figure 4A:
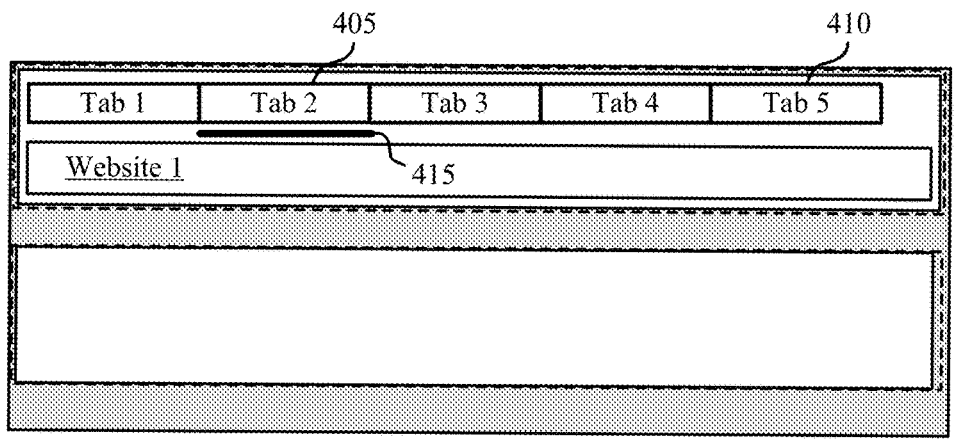
FIGS. 4A, 4B and 4C illustrate examples of user interfaces that support web browser tab navigation during video conference session in accordance with aspects of the present disclosure.
Figure 4B:
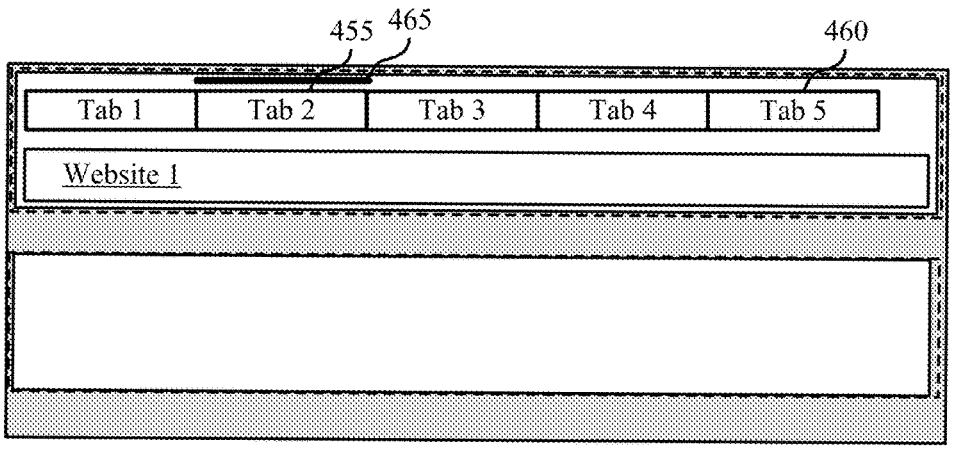
Figure 4C:
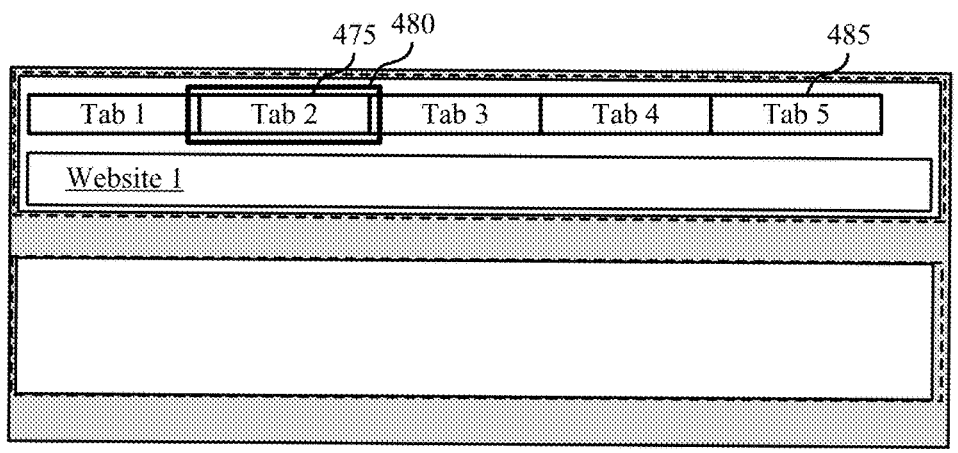

FIGS. 4A, 4B and 4C illustrate examples of user interfaces 400, 450 and 470 that support web browser tab navigation during video conference session in accordance with aspects of the present disclosure. The user interface 400 may correspond to a desktop or mobile or other user interface type. In some cases, additional user interface types may be supported for implementing tab navigation during video conference session. The user interface 400 may support a view of a tab displaying an active video conference session.

As depicted in the example of FIG. 4A, the user interface 400 may display a video conference session for a user of a user device. The user interface 400 may receive an input via a visual component to visually distinguish a first tab 405 (e.g., Tab 2) from a set of tabs for a duration of the video conference session. Upon receiving the input, the user device may display a visual marker associated with the first tab 405 for the duration of the video conference session. As depicted herein, the user device may an underline 415 under the first tab 405 to visually distinguish the first tab 405 from the set of tabs. In the example of FIG. 4A, the user device may display a second tab 410 (e.g., Tab 5) while the first tab 405 remains highlighted for the duration of the active video conference session.

The user interface 450 may correspond to a desktop or mobile or other user interface type. In some cases, additional user interface types may be supported for implementing tab navigation during video conference session. The user interface 450 may support a view of a tab displaying an active video conference session. As depicted in the example of FIG. 4B, the user interface 450 may display a video conference session for a user of a user device. The user interface 450 may receive an input via a visual component to visually distinguish a first tab 455 (e.g., Tab 2) from a set of tabs for a duration of the video conference session. Upon receiving the input, the user device may display a visual marker associated with the first tab 455 for the duration of the video conference session. As depicted herein, the user device may display a line 465 over the first tab 455 to visually distinguish the first tab 455 from the set of tabs. In the example of FIG. 4B, the user device may display a second tab 460 (e.g., Tab 5) while the first tab 455 remains highlighted for the duration of the active video conference session.

The user interface 470 may correspond to a desktop or mobile or other user interface type. In some cases, additional user interface types may be supported for implementing tab navigation during video conference session. The user interface 470 may support a view of a tab displaying an active video conference session. As depicted in the example of FIG. 4C, the user interface 470 may display a video conference session for a user of a user device. The user interface 470 may receive an input via a visual component to visually distinguish a first tab 475 (e.g., Tab 2) from a set of tabs for a duration of the video conference session. Upon receiving the input, the user device may display a visual marker associated with the first tab 475 for the duration of the video conference session. As depicted herein, the user device may display a rectangular box 480 around the first tab 475 to visually distinguish the first tab 475 from the set of tabs. In the example of FIG. 4C, the user device may display a second tab 485 (e.g., Tab 5) while the first tab 475 remains highlighted for the duration of the active video conference session.

Figure 5:
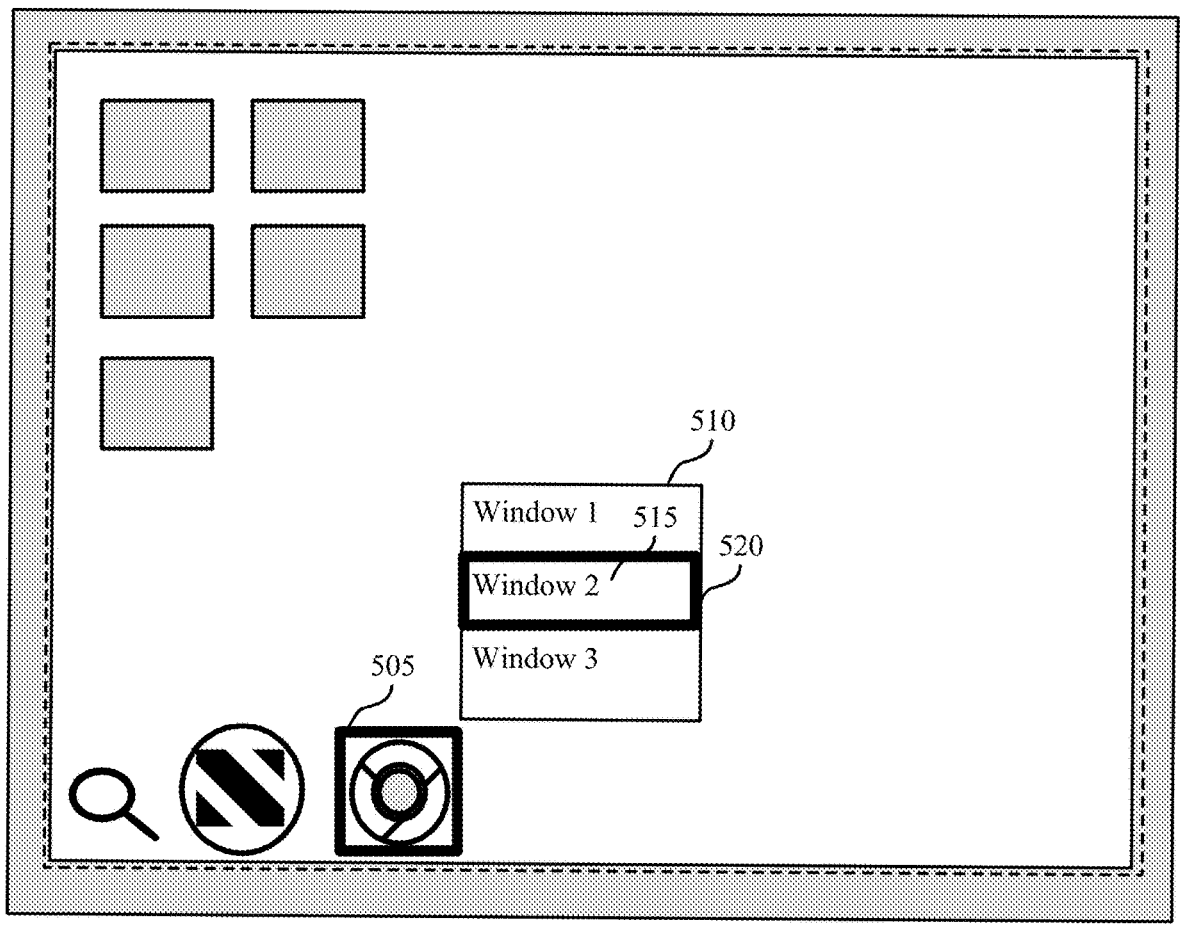
FIG. 5 illustrates an example of a user interface that supports web browser tab navigation during video conference session in accordance with aspects of the present disclosure.

FIG. 5 illustrates an example of a user interface 500 that supports web browser tab navigation during video conference session in accordance with aspects of the present disclosure. The user interface 500 may correspond to a desktop or mobile or other user interface type. In some cases, additional user interface types may be supported for implementing tab navigation during video conference session.

As depicted in the example of FIG. 5, the user interface 500 may include a first tab including an active video conference session of a video conference application. In some examples, a user may provide an input to visually distinguish the first tab from a set of tabs for a duration of the video conference session. In some examples, the first tab may be visually rendered within a first window 515 of a set of windows 510 of the web browser 505. Upon receiving the input to visually distinguish the first tab from a set of tabs, the user interface 500 may display a second visual marker 520 that visually distinguishes the first window 515 from the set of windows 510 of the web browser 505. As depicted herein, the user interface 500 may display a visual marker to highlight the window including the tab displaying an active video conference session.

Figure 6:
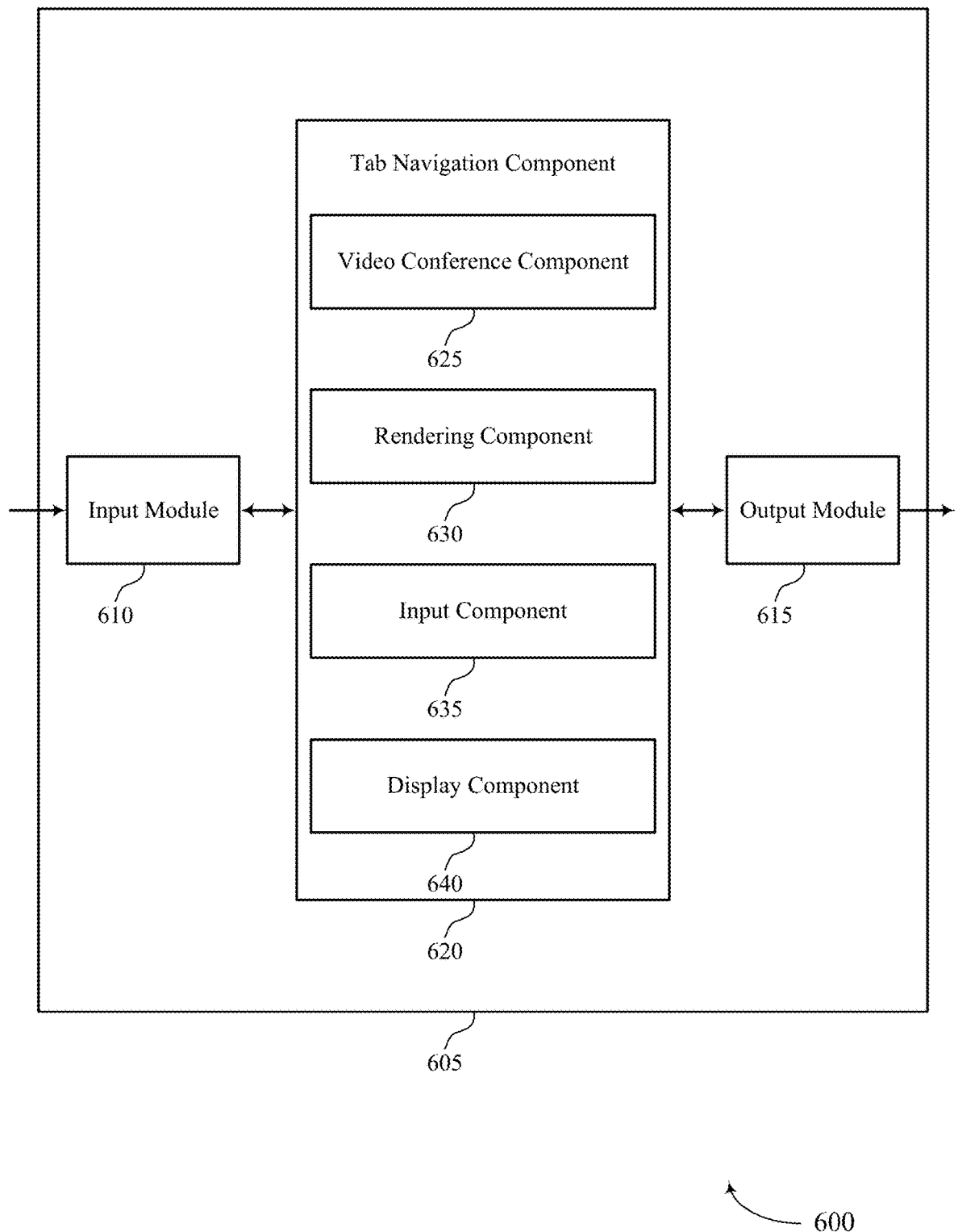
FIG. 6 shows a block diagram of an apparatus that supports web browser tab navigation during video conference session in accordance with aspects of the present disclosure.

FIG. 6 shows a block diagram 600 of a device 605 that supports web browser tab navigation during video conference session in accordance with aspects of the present disclosure. The device 605 may include an input module 610, an output module 615, and a tab navigation component 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the tab navigation component 620 to support web browser tab navigation during video conference session. In some cases, the input module 610 may be a component of an I/O controller 810 as described with reference to FIG. 8.

The output module 615 may manage output signals for the device 605. For example, the output module 615 may receive signals from other components of the device 605, such as the tab navigation component 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the tab navigation component 620 may include a video conference component 625, a rendering component 630, an input component 635, a display component 640, or any combination thereof. In some examples, the tab navigation component 620, or various components thereof, may be configured to perform various operations (e.g., receiving, monitoring, transmitting) using or otherwise in cooperation with the input module 610, the output module 615, or both. For example, the tab navigation component 620 may receive information from the input module 610, send information to the output module 615, or be integrated in combination with the input module 610, the output module 615, or both to receive information, transmit information, or perform various other operations as described herein.

The tab navigation component 620 may support web browser tab navigation in accordance with examples as disclosed herein. The video conference component 625 may be configured as or otherwise support a means for initiating, via a web browser and in a first tab of a plurality of tabs of the web browser, a video conference session of a video conference application. The rendering component 630 may be configured as or otherwise support a means for rendering a visual component in a user interface of the video conference session that indicates enablement of tab navigation functionality for the video conference application, wherein enablement of the tab navigation functionality is based at least in part on an extension for the video conference application being installed in the web browser. The input component 635 may be configured as or otherwise support a means for receiving an input via the visual component to visually distinguish the first tab from the plurality of tabs for a duration of the video conference session. The display component 640 may be configured as or otherwise support a means for causing for display a visual marker associated with the first tab for the duration of the video conference session based at least in part on receiving the input.

Figure 7:
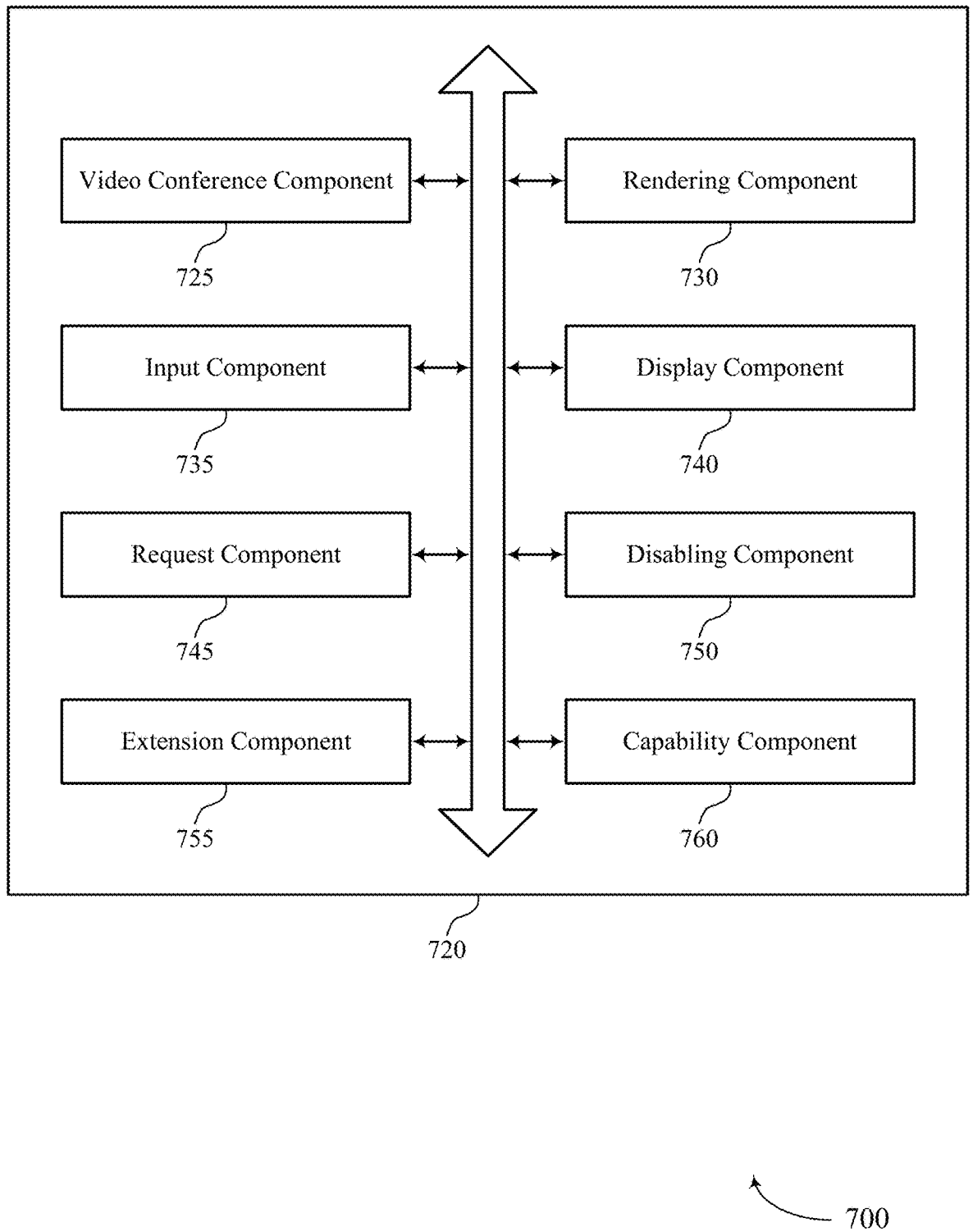
FIG. 7 shows a block diagram of a tab navigation component that supports web browser tab navigation during video conference session in accordance with aspects of the present disclosure.

FIG. 7 shows a block diagram 700 of a tab navigation component 720 that supports web browser tab navigation during video conference session in accordance with aspects of the present disclosure. The tab navigation component 720 may be an example of aspects of a tab navigation component 820 or a tab navigation component 620, or both, as described herein. The tab navigation component 720, or various components thereof, may be an example of means for performing various aspects of web browser tab navigation during video conference session as described herein. For example, the tab navigation component 720 may include a video conference component 725, a rendering component 730, an input component 735, a display component 740, a request component 745, a disabling component 750, an extension component 755, a capability component 760, or any combination thereof. Each of these components may communicate, directly or indirectly, with one another (e.g., via one or more buses).

The tab navigation component 720 may support web browser tab navigation in accordance with examples as disclosed herein. The video conference component 725 may be configured as or otherwise support a means for initiating, via a web browser and in a first tab of a plurality of tabs of the web browser, a video conference session of a video conference application. The rendering component 730 may be configured as or otherwise support a means for rendering a visual component in a user interface of the video conference session that indicates enablement of tab navigation functionality for the video conference application, wherein enablement of the tab navigation functionality is based at least in part on an extension for the video conference application being installed in the web browser. The input component 735 may be configured as or otherwise support a means for receiving an input via the visual component to visually distinguish the first tab from the plurality of tabs for a duration of the video conference session. The display component 740 may be configured as or otherwise support a means for causing for display a visual marker associated with the first tab for the duration of the video conference session based at least in part on receiving the input.

In some examples, the input component 735 may be configured as or otherwise support a means for receiving a second input via the visual component to visually distinguish a second tab from a second plurality of tabs, wherein the second plurality of tabs corresponds to a web browser of a second attendee of the video conference session. In some examples, the request component 745 may be configured as or otherwise support a means for transmitting a request to the web browser of the second attendee to visually distinguish the second tab from the second plurality of tabs for the duration of the video conference session based at least in part on receiving the second input.

In some examples, the capability component 760 may be configured as or otherwise support a means for receiving a capability message from the web browser of the second attendee indicating a capability of the second web browser to visually distinguish the second tab from the second plurality of tabs, wherein the capability of the second web browser is based at least in part on the extension for the video conference application being installed in the second web browser. In some examples, the visual component visually indicates the capability of the second web browser.

In some examples, the first tab is visually rendered within a first window of a plurality of windows of the web browser. In some examples, the causing for display the visual marker associated with the first tab comprises causing for display a second visual marker that visually distinguishes the first window from the plurality of windows of the web browser based at least in part on the first tab being visually rendered within the first window.

In some examples, the input component 735 may be configured as or otherwise support a means for receiving, via a keyboard shortcut configured for the extension for the video conference application, a keyboard input to return to the first tab from the plurality of tabs. In some examples, the display component 740 may be configured as or otherwise support a means for causing for display the first tab from the plurality of tabs based at least in part on receiving the keyboard input.

In some examples, the video conference component 725 may be configured as or otherwise support a means for determining that the video conference session of the video conference application has concluded. In some examples, the disabling component 750 may be configured as or otherwise support a means for disabling the visual marker associated with the first tab based at least in part on determining that the video conference session of the video conference application has concluded.

In some examples, the extension component 755 may be configured as or otherwise support a means for receiving a request to download the extension for the video conference application. In some examples, the extension component 755 may be configured as or otherwise support a means for installing the extension for the video conference application in the web browser.

In some examples, to support rendering the visual component, the rendering component 730 may be configured as or otherwise support a means for rendering an indication of an option to disable an active visual marker associated with the first tab for the duration of the video conference session.

In some examples, the input component 735 may be configured as or otherwise support a means for receiving a second input via the visual component to disable the visual marker associated with the first tab. In some examples, the disabling component 750 may be configured as or otherwise support a means for disabling the visual marker associated with the first tab for a remaining duration of the video conference session based at least in part on receiving the second input.

Figure 8:
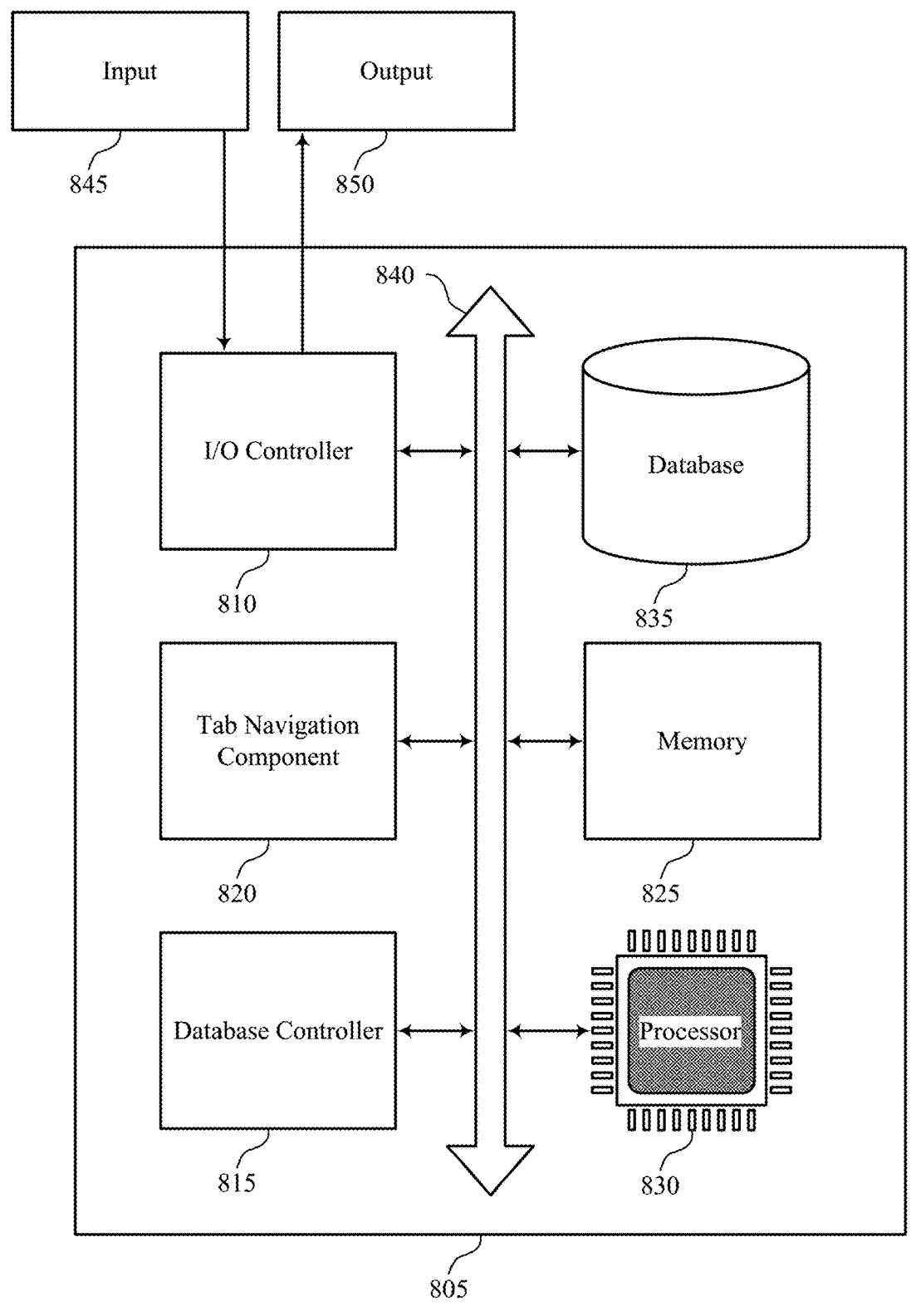
FIG. 8 shows a diagram of a system including a device that supports web browser tab navigation during video conference session in accordance with aspects of the present disclosure.

FIG. 8 shows a diagram of a system 800 including a device 805 that supports web browser tab navigation during video conference session in accordance with aspects of the present disclosure. The device 805 may be an example of or include the components of a device 605 as described herein. The device 805 may include components for bi-directional data communications including components for transmitting and receiving communications, such as a tab navigation component 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and ROM. The memory 825 may store computer-readable, computer-executable software including instructions that, when executed, cause the processor 830 to perform various functions described herein. In some cases, the memory 825 may contain, among other things, a BIOS which may control basic hardware or software operation such as the interaction with peripheral components or devices.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting web browser tab navigation during video conference session).

The tab navigation component 820 may support web browser tab navigation in accordance with examples as disclosed herein. For example, the tab navigation component 820 may be configured as or otherwise support a means for initiating, via a web browser and in a first tab of a plurality of tabs of the web browser, a video conference session of a video conference application. The tab navigation component 820 may be configured as or otherwise support a means for rendering a visual component in a user interface of the video conference session that indicates enablement of tab navigation functionality for the video conference application, wherein enablement of the tab navigation functionality is based at least in part on an extension for the video conference application being installed in the web browser. The tab navigation component 820 may be configured as or otherwise support a means for receiving an input via the visual component to visually distinguish the first tab from the plurality of tabs for a duration of the video conference session. The tab navigation component 820 may be configured as or otherwise support a means for causing for display a visual marker associated with the first tab for the duration of the video conference session based at least in part on receiving the input.

By including or configuring the tab navigation component 820 in accordance with examples as described herein, the device 805 may support techniques for improved communication reliability, reduced latency, improved user experience related to reduced processing, reduced power consumption, and more efficient utilization of communication resources.

Figure 9:
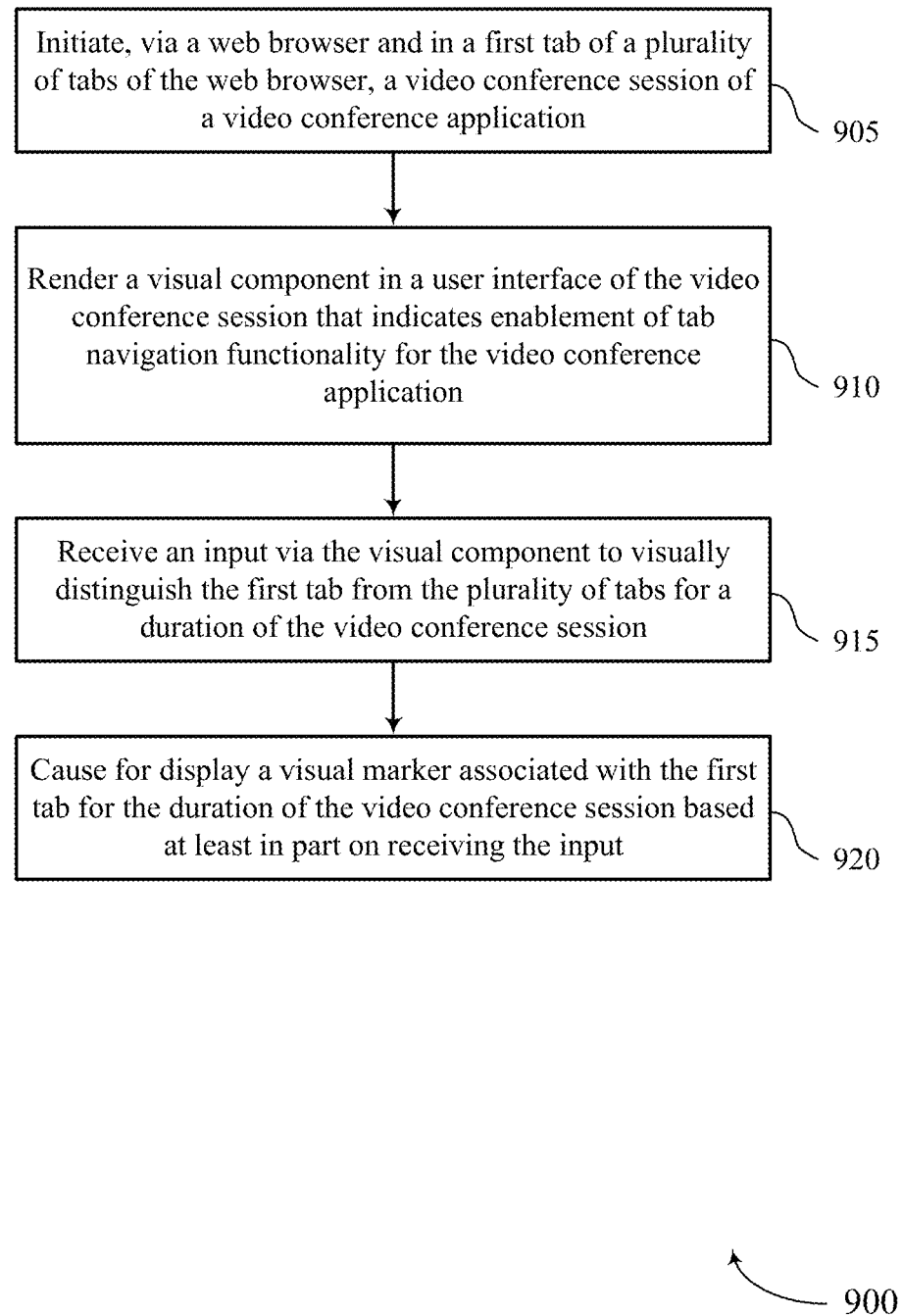
FIGS. 9 through 12 show flowcharts illustrating methods that support web browser tab navigation during video conference session in accordance with aspects of the present disclosure.

FIG. 9 shows a flowchart illustrating a method 900 that supports web browser tab navigation during video conference session in accordance with aspects of the present disclosure. The operations of the method 900 may be implemented by a user device or its components as described herein. For example, the operations of the method 900 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 905, the method may include initiating, via a web browser and in a first tab of a plurality of tabs of the web browser, a video conference session of a video conference application. The operations of 905 may be performed in accordance with examples as disclosed herein. In some examples, aspects of the operations of 905 may be performed by a video conference component 725 as described with reference to FIG. 7.

At 910, the method may include rendering a visual component in a user interface of the video conference session that indicates enablement of tab navigation functionality for the video conference application. In some examples, enablement of the tab navigation functionality is based an extension for the video conference application being installed in the web browser. The operations of 910 may be performed in accordance with examples as disclosed herein. In some examples, aspects of the operations of 910 may be performed by a rendering component 730 as described with reference to FIG. 7.

At 915, the method may include receiving an input via the visual component to visually distinguish the first tab from the plurality of tabs for a duration of the video conference session. The operations of 915 may be performed in accordance with examples as disclosed herein. In some examples, aspects of the operations of 915 may be performed by an input component 735 as described with reference to FIG. 7.

At 920, the method may include causing for display a visual marker associated with the first tab for the duration of the video conference session based at least in part on receiving the input. The operations of 920 may be performed in accordance with examples as disclosed herein. In some examples, aspects of the operations of 920 may be performed by a display component 740 as described with reference to FIG. 7.

Figure 10:
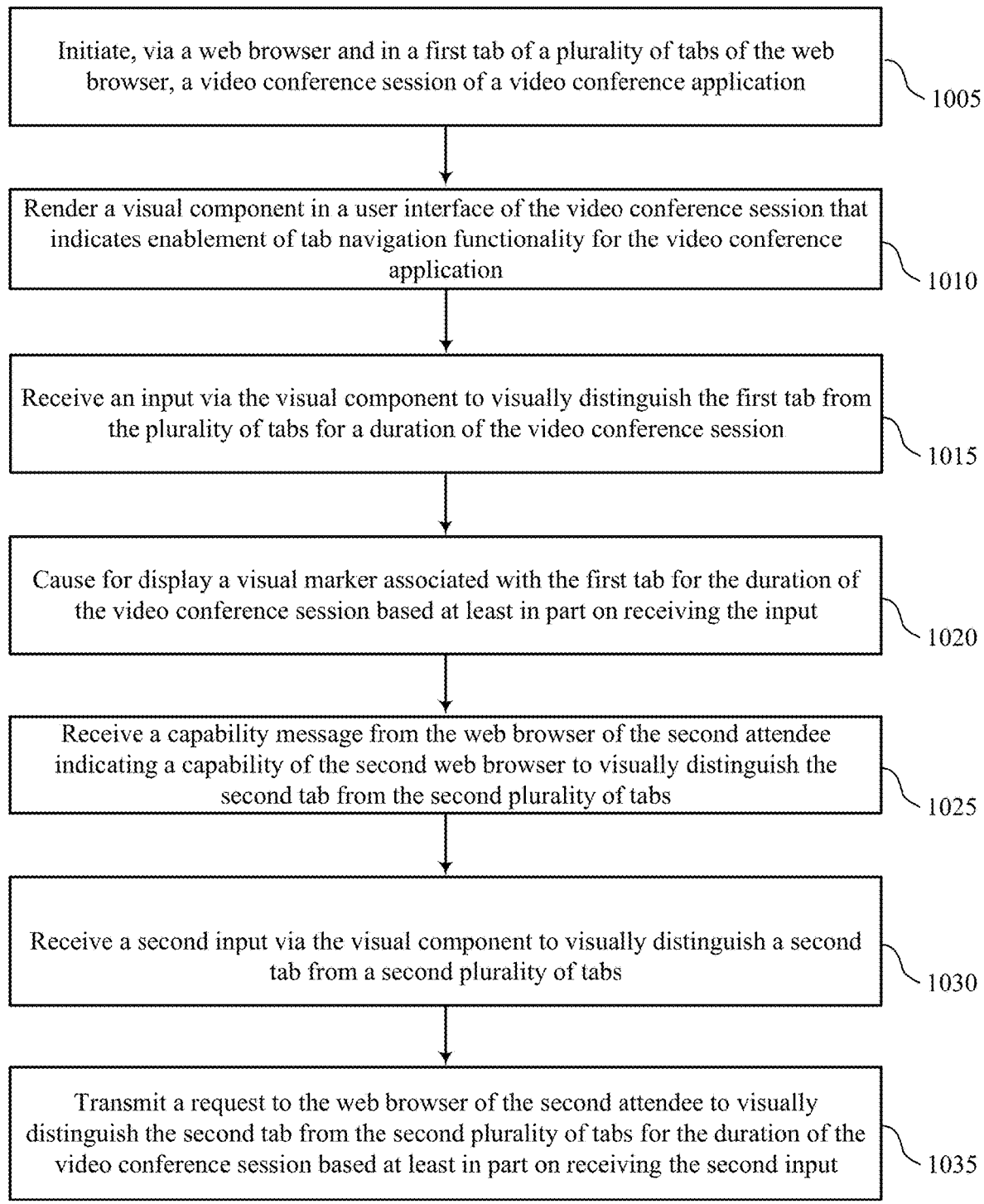

FIG. 10 shows a flowchart illustrating a method 1000 that supports web browser tab navigation during video conference session in accordance with aspects of the present disclosure. The operations of the method 1000 may be implemented by a user device or its components as described herein. For example, the operations of the method 1000 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1005, the method may include initiating, via a web browser and in a first tab of a plurality of tabs of the web browser, a video conference session of a video conference application. The operations of 1005 may be performed in accordance with examples as disclosed herein. In some examples, aspects of the operations of 1005 may be performed by a video conference component 725 as described with reference to FIG. 7.

At 1010, the method may include rendering a visual component in a user interface of the video conference session that indicates enablement of tab navigation functionality for the video conference application. In some examples, enablement of the tab navigation functionality is based at least in part on an extension for the video conference application being installed in the web browser. The operations of 1010 may be performed in accordance with examples as disclosed herein. In some examples, aspects of the operations of 1010 may be performed by a rendering component 730 as described with reference to FIG. 7.

At 1015, the method may include receiving an input via the visual component to visually distinguish the first tab from the plurality of tabs for a duration of the video conference session. The operations of 1015 may be performed in accordance with examples as disclosed herein. In some examples, aspects of the operations of 1015 may be performed by an input component 735 as described with reference to FIG. 7.

At 1020, the method may include causing for display a visual marker associated with the first tab for the duration of the video conference session based at least in part on receiving the input. The operations of 1020 may be performed in accordance with examples as disclosed herein. In some examples, aspects of the operations of 1020 may be performed by a display component 740 as described with reference to FIG. 7.

At 1025, the method may include receiving a capability message from the web browser of the second attendee indicating a capability of the second web browser to visually distinguish the second tab from the second plurality of tabs. In some examples, the capability of the second web browser is based at least in part on the extension for the video conference application being installed in the second web browser. The operations of 1025 may be performed in accordance with examples as disclosed herein. In some examples, aspects of the operations of 1025 may be performed by a capability component 760 as described with reference to FIG. 7.

At 1030, the method may include receiving a second input via the visual component to visually distinguish a second tab from a second plurality of tabs. In some examples, the second plurality of tabs corresponds to a web browser of a second attendee of the video conference session. The operations of 1030 may be performed in accordance with examples as disclosed herein. In some examples, aspects of the operations of 1030 may be performed by an input component 735 as described with reference to FIG. 7.

At 1035, the method may include transmitting a request to the web browser of the second attendee to visually distinguish the second tab from the second plurality of tabs for the duration of the video conference session based at least in part on receiving the second input. The operations of 1035 may be performed in accordance with examples as disclosed herein. In some examples, aspects of the operations of 1035 may be performed by a request component 745 as described with reference to FIG. 7.

Figure 11:
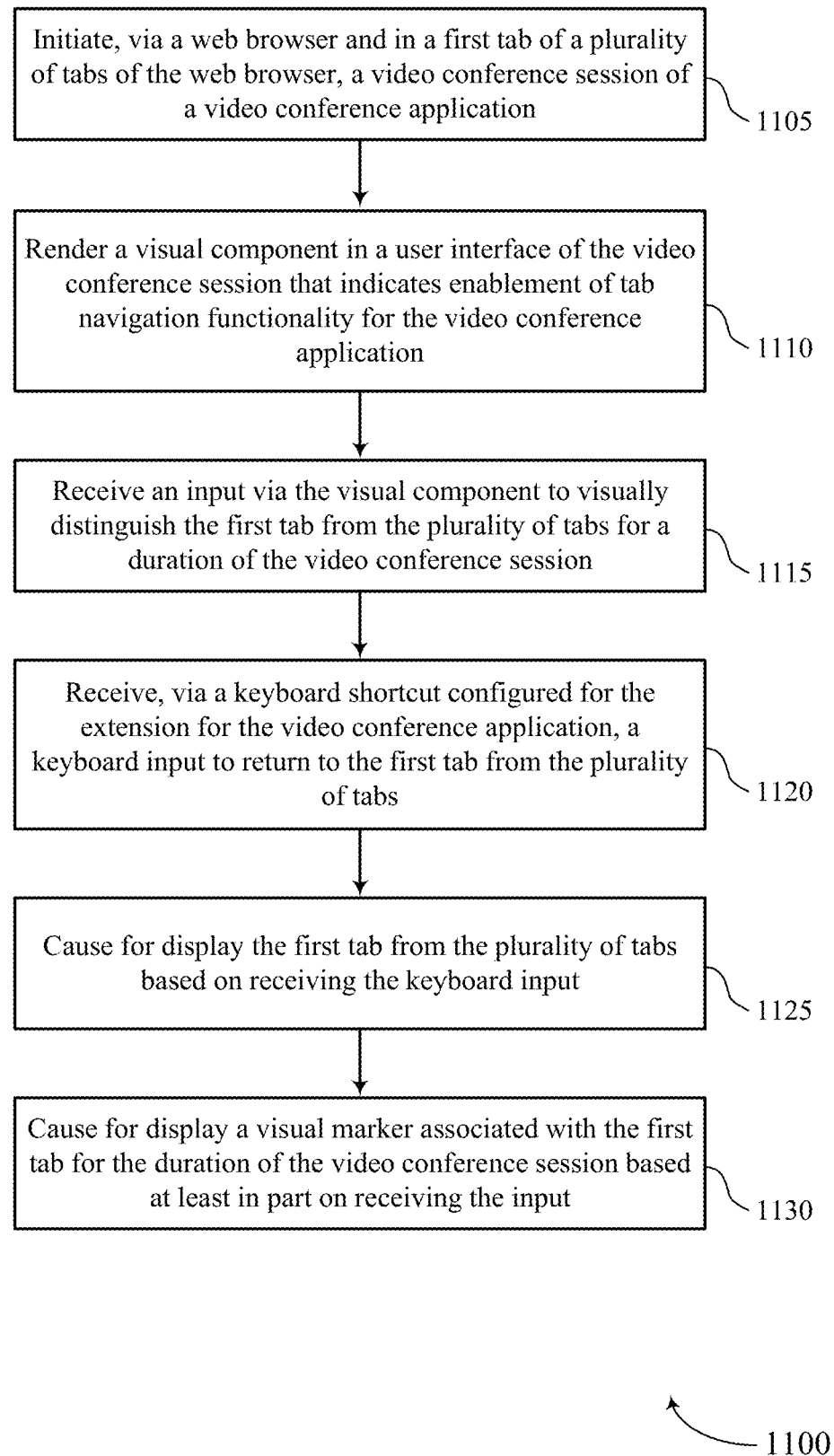

FIG. 11 shows a flowchart illustrating a method 1100 that supports web browser tab navigation during video conference session in accordance with aspects of the present disclosure. The operations of the method 1100 may be implemented by a user device or its components as described herein. For example, the operations of the method 1100 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1105, the method may include initiating, via a web browser and in a first tab of a plurality of tabs of the web browser, a video conference session of a video conference application. The operations of 1105 may be performed in accordance with examples as disclosed herein. In some examples, aspects of the operations of 1105 may be performed by a video conference component 725 as described with reference to FIG. 7.

At 1110, the method may include rendering a visual component in a user interface of the video conference session that indicates enablement of tab navigation functionality for the video conference application. In some examples, enablement of the tab navigation functionality is based at least in part on an extension for the video conference application being installed in the web browser. The operations of 1110 may be performed in accordance with examples as disclosed herein. In some examples, aspects of the operations of 1110 may be performed by a rendering component 730 as described with reference to FIG. 7.

At 1115, the method may include receiving an input via the visual component to visually distinguish the first tab from the plurality of tabs for a duration of the video conference session. The operations of 1115 may be performed in accordance with examples as disclosed herein. In some examples, aspects of the operations of 1115 may be performed by an input component 735 as described with reference to FIG. 7.

At 1120, the method may include receiving, via a keyboard shortcut configured for the extension for the video conference application, a keyboard input to return to the first tab from the plurality of tabs. The operations of 1120 may be performed in accordance with examples as disclosed herein. In some examples, aspects of the operations of 1120 may be performed by an input component 735 as described with reference to FIG. 7.

At 1125, the method may include causing for display the first tab from the plurality of tabs based at least in part on receiving the keyboard input. The operations of 1125 may be performed in accordance with examples as disclosed herein. In some examples, aspects of the operations of 1125 may be performed by a display component 740 as described with reference to FIG. 7.

At 1130, the method may include causing for display a visual marker associated with the first tab for the duration of the video conference session based at least in part on receiving the input. The operations of 1130 may be performed in accordance with examples as disclosed herein. In some examples, aspects of the operations of 1130 may be performed by a display component 740 as described with reference to FIG. 7.

Figure 12:
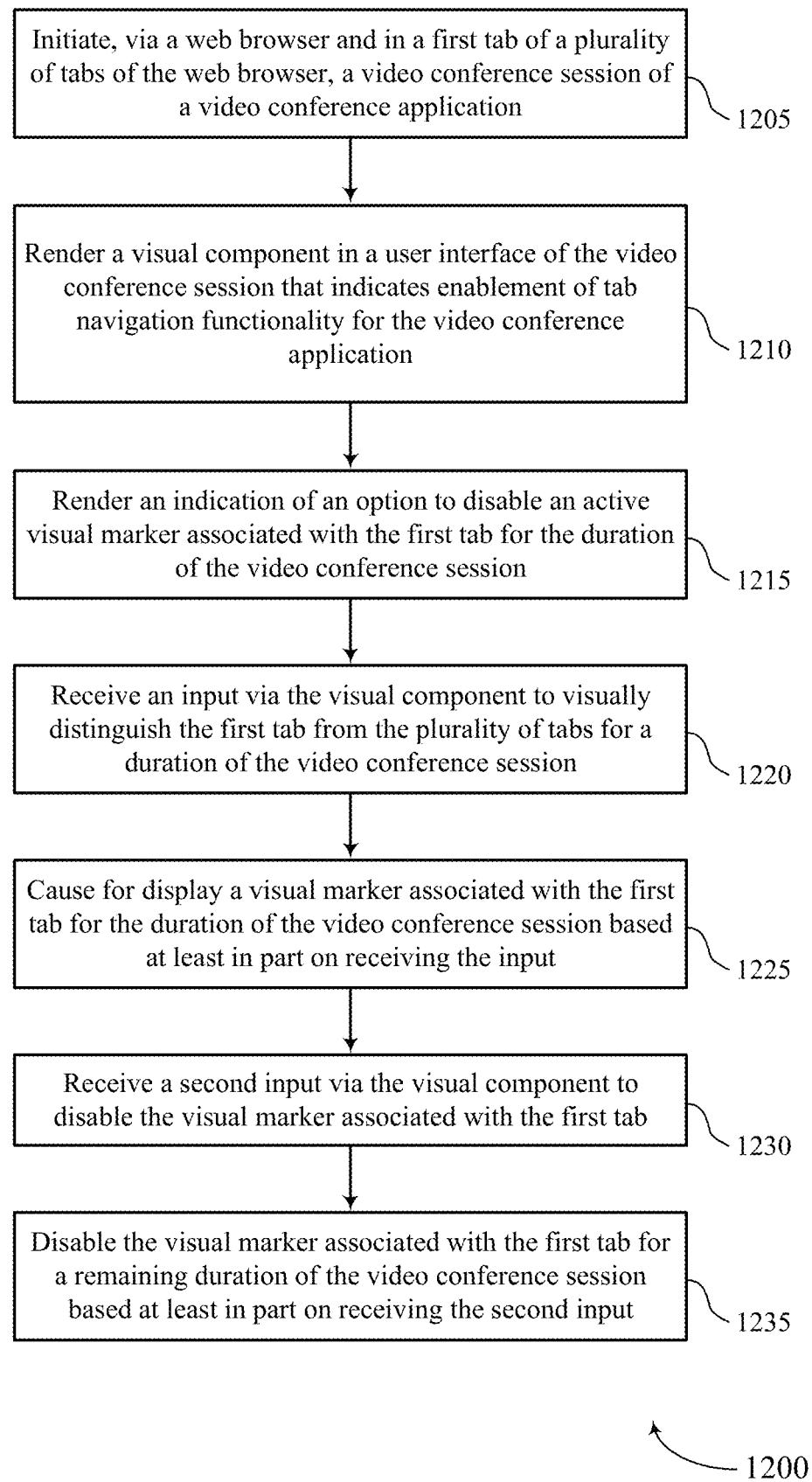

FIG. 12 shows a flowchart illustrating a method 1200 that supports web browser tab navigation during video conference session in accordance with aspects of the present disclosure. The operations of the method 1200 may be implemented by a user device or its components as described herein. For example, the operations of the method 1200 may be performed by a user device as described with reference to FIGS. 1 through 8. In some examples, a user device may execute a set of instructions to control the functional elements of the user device to perform the described functions. Additionally or alternatively, the user device may perform aspects of the described functions using special-purpose hardware.

At 1205, the method may include initiating, via a web browser and in a first tab of a plurality of tabs of the web browser, a video conference session of a video conference application. The operations of 1205 may be performed in accordance with examples as disclosed herein. In some examples, aspects of the operations of 1205 may be performed by a video conference component 725 as described with reference to FIG. 7.

At 1210, the method may include rendering a visual component in a user interface of the video conference session that indicates enablement of tab navigation functionality for the video conference application. In some examples, enablement of the tab navigation functionality is based at least in part on an extension for the video conference application being installed in the web browser. The operations of 1210 may be performed in accordance with examples as disclosed herein. In some examples, aspects of the operations of 1210 may be performed by a rendering component 730 as described with reference to FIG. 7.

At 1215, the method may include rendering an indication of an option to disable an active visual marker associated with the first tab for the duration of the video conference session. The operations of 1215 may be performed in accordance with examples as disclosed herein. In some examples, aspects of the operations of 1215 may be performed by a rendering component 730 as described with reference to FIG. 7.

At 1220, the method may include receiving an input via the visual component to visually distinguish the first tab from the plurality of tabs for a duration of the video conference session. The operations of 1220 may be performed in accordance with examples as disclosed herein. In some examples, aspects of the operations of 1220 may be performed by an input component 735 as described with reference to FIG. 7.

At 1225, the method may include causing for display a visual marker associated with the first tab for the duration of the video conference session based at least in part on receiving the input. The operations of 1225 may be performed in accordance with examples as disclosed herein. In some examples, aspects of the operations of 1225 may be performed by a display component 740 as described with reference to FIG. 7.

At 1230, the method may include receiving a second input via the visual component to disable the visual marker associated with the first tab. The operations of 1230 may be performed in accordance with examples as disclosed herein. In some examples, aspects of the operations of 1230 may be performed by an input component 735 as described with reference to FIG. 7.

At 1235, the method may include disabling the visual marker associated with the first tab for a remaining duration of the video conference session based at least in part on receiving the second input. The operations of 1235 may be performed in accordance with examples as disclosed herein. In some examples, aspects of the operations of 1235 may be performed by a disabling component 750 as described with reference to FIG. 7.

A method for web browser tab navigation is described. The method may include initiating, via a web browser and in a first tab of a plurality of tabs of the web browser, a video conference session of a video conference application, rendering a visual component in a user interface of the video conference session that indicates enablement of tab navigation functionality for the video conference application, wherein enablement of the tab navigation functionality is based at least in part on an extension for the video conference application being installed in the web browser, receiving an input via the visual component to visually distinguish the first tab from the plurality of tabs for a duration of the video conference session, and causing for display a visual marker associated with the first tab for the duration of the video conference session based at least in part on receiving the input.

An apparatus for web browser tab navigation is described. The apparatus may include a processor, memory coupled with the processor, and instructions stored in the memory. The instructions may be executable by the processor to cause the apparatus to initiate, via a web browser and in a first tab of a plurality of tabs of the web browser, a video conference session of a video conference application, render a visual component in a user interface of the video conference session that indicates enablement of tab navigation functionality for the video conference application, wherein enablement of the tab navigation functionality is based at least in part on an extension for the video conference application being installed in the web browser, receive an input via the visual component to visually distinguish the first tab from the plurality of tabs for a duration of the video conference session, and cause for display a visual marker associated with the first tab for the duration of the video conference session based at least in part on receiving the input.

Another apparatus for web browser tab navigation is described. The apparatus may include means for initiating, via a web browser and in a first tab of a plurality of tabs of the web browser, a video conference session of a video conference application, means for rendering a visual component in a user interface of the video conference session that indicates enablement of tab navigation functionality for the video conference application, wherein enablement of the tab navigation functionality is based at least in part on an extension for the video conference application being installed in the web browser, means for receiving an input via the visual component to visually distinguish the first tab from the plurality of tabs for a duration of the video conference session, and means for causing for display a visual marker associated with the first tab for the duration of the video conference session based at least in part on receiving the input.

A non-transitory computer-readable medium storing code for web browser tab navigation is described. The code may include instructions executable by a processor to initiate, via a web browser and in a first tab of a plurality of tabs of the web browser, a video conference session of a video conference application, render a visual component in a user interface of the video conference session that indicates enablement of tab navigation functionality for the video conference application, wherein enablement of the tab navigation functionality is based at least in part on an extension for the video conference application being installed in the web browser, receive an input via the visual component to visually distinguish the first tab from the plurality of tabs for a duration of the video conference session, and cause for display a visual marker associated with the first tab for the duration of the video conference session based at least in part on receiving the input.

Some examples of the method, apparatuses, and non-transitory computer-readable medium described herein may further include operations, features, means, or instructions for receiving a second input via the visual component to visually distinguish a second tab from a second plurality of tabs, wherein the second plurality of tabs corresponds to a web browser of a second attendee of the video conference session and transmitting a request to the web browser of the second attendee to visually distinguish the second tab from the second plurality of tabs for the duration of the video conference session based at least in part on receiving the second input.

Some examples of the method, apparatuses, and non-transitory computer-readable medium described herein may further include operations, features, means, or instructions for receiving a capability message from the web browser of the second attendee indicating a capability of the second web browser to visually distinguish the second tab from the second plurality of tabs, wherein the capability of the second web browser may be based at least in part on the extension for the video conference application being installed in the second web browser.

In some examples of the method, apparatuses, and non-transitory computer-readable medium described herein, the visual component visually indicates the capability of the second web browser. In some examples of the method, apparatuses, and non-transitory computer-readable medium described herein, the first tab may be visually rendered within a first window of a plurality of windows of the web browser and the causing for display the visual marker associated with the first tab comprises causing for display a second visual marker that visually distinguishes the first window from the plurality of windows of the web browser based at least in part on the first tab being visually rendered within the first window.

Some examples of the method, apparatuses, and non-transitory computer-readable medium described herein may further include operations, features, means, or instructions for receiving, via a keyboard shortcut configured for the extension for the video conference application, a keyboard input to return to the first tab from the plurality of tabs and causing for display the first tab from the plurality of tabs based at least in part on receiving the keyboard input.

Some examples of the method, apparatuses, and non-transitory computer-readable medium described herein may further include operations, features, means, or instructions for determining that the video conference session of the video conference application may have concluded and disabling the visual marker associated with the first tab based at least in part on determining that the video conference session of the video conference application may have concluded.

Some examples of the method, apparatuses, and non-transitory computer-readable medium described herein may further include operations, features, means, or instructions for receiving a request to download the extension for the video conference application and installing the extension for the video conference application in the web browser.

In some examples of the method, apparatuses, and non-transitory computer-readable medium described herein, rendering the visual component may include operations, features, means, or instructions for rendering an indication of an option to disable an active visual marker associated with the first tab for the duration of the video conference session.

Some examples of the method, apparatuses, and non-transitory computer-readable medium described herein may further include operations, features, means, or instructions for receiving a second input via the visual component to disable the visual marker associated with the first tab and disabling the visual marker associated with the first tab for a remaining duration of the video conference session based at least in part on receiving the second input.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for web browser tab navigation, comprising:
   initiating, via a web browser and in a first tab of a plurality of tabs of the web browser, a video conference session of a video conference application;
   rendering a visual component in a user interface of the video conference session that indicates enablement of tab navigation functionality for the video conference application, the visual component indicating a first option to enable visual marking of the first tab, a second option to request a second web browser of a second attendee to visually distinguish a second tab that is actively hosting the video conference application within the second web browser, and a third option to disable visual marking of the first tab, wherein the enablement of the tab navigation functionality is based at least in part on an extension for the video conference application being installed in the web browser;
   receiving an input selecting the first option via the visual component to visually distinguish the first tab from the plurality of tabs for a duration of the video conference session; and
   causing for display the visual marker associated with the first tab for the duration of the video conference session based at least in part on receiving the input.

2. The method of claim 1, further comprising:
   receiving a second input selecting the second option via the visual component to visually distinguish the second tab from a second plurality of tabs, wherein the second plurality of tabs corresponds to the second web browser of the second attendee of the video conference session; and
   transmitting a request to the second web browser of the second attendee to visually distinguish the second tab from the second plurality of tabs for the duration of the video conference session based at least in part on receiving the second input.

3. The method of claim 2, further comprising:
   receiving a capability message from the web browser of the second attendee indicating a capability of the second web browser to visually distinguish the second tab from the second plurality of tabs, wherein the capability of the second web browser is based at least in part on the extension for the video conference application being installed in the second web browser.

4. The method of claim 3, wherein the visual component visually indicates the capability of the second web browser.

5. The method of claim 1, wherein:
   the first tab is visually rendered within a first window of a plurality of windows of the web browser; and
   the causing for display the visual marker associated with the first tab comprises causing for display a second visual marker that visually distinguishes the first window from the plurality of windows of the web browser based at least in part on the first tab being visually rendered within the first window.

6. The method of claim 1, further comprising:
   receiving, via a keyboard shortcut configured for the extension for the video conference application, a keyboard input to return to the first tab from the plurality of tabs; and
   causing for display the first tab from the plurality of tabs based at least in part on receiving the keyboard input.

7. The method of claim 1, further comprising:
   determining that the video conference session of the video conference application has concluded; and
   disabling the visual marker associated with the first tab based at least in part on determining that the video conference session of the video conference application has concluded.

8. The method of claim 1, further comprising:
   receiving a request to download the extension for the video conference application; and
   installing the extension for the video conference application in the web browser.

9. The method of claim 1, wherein rendering the visual component further comprises:
   rendering an indication of the third option to disable an active visual marker associated with the first tab for the duration of the video conference session.

10. The method of claim 9, further comprising:
    receiving a second input selecting the third option via the visual component to disable the visual marker associated with the first tab; and disabling the visual marker associated with the first tab for a remaining duration of the video conference session based at least in part on receiving the second input.

11. An apparatus for web browser tab navigation, comprising:
a processor;
memory coupled with the processor; and
instructions stored in the memory and executable by the processor to cause the apparatus to:
initiate, via a web browser and in a first tab of a plurality of tabs of the web browser, a video conference session of a video conference application;
render a visual component in a user interface of the video conference session that indicates enablement of tab navigation functionality for the video conference application, the visual component indicating a first option to enable pofivisual markilg of the first tab, a second option to request a second web browser of a second attendee to visually distinguish a second tab that is actively hosting the video conference application within the second web browser, and a third option to disable visual marking of the first tab, wherein the enablement of the tab navigation functionality is based at least in part on an extension for the video conference application being installed in the web browser;
receive an input selecting the first option via the visual component to visually distinguish the first tab from the plurality of tabs for a duration of the video conference session; and cause for display the visual marker associated with the first tab for the duration of the video conference session based at least in part on receiving the input.

12. The apparatus of claim 11, wherein the instructions are further executable by the processor to cause the apparatus to:
receive a second input selecting the second option via the visual component to visually distinguish the second tab from a second plurality of tabs, wherein the second plurality of tabs corresponds to the second web browser of the second attendee of the video conference session; and
transmit a request to the second web browser of the second attendee to visually distinguish the second tab from the second plurality of tabs for the duration of the video conference session based at least in part on receiving the second input.

13. The apparatus of claim 12, wherein the instructions are further executable by the processor to cause the apparatus to:
receive a capability message from the web browser of the second attendee indicating a capability of the second web browser to visually distinguish the second tab from the second plurality of tabs, wherein the capability of the second web browser is based at least in part on the extension for the video conference application being installed in the second web browser.

14. The apparatus of claim 13, wherein the visual component visually indicates the capability of the second web browser.

15. The apparatus of claim 11, wherein:
the first tab is visually rendered within a first window of a plurality of windows of the web browser; and
the causing for display the visual marker associated with the first tab comprises causing for display a second visual marker that visually distinguishes the first window from the plurality of windows of the web browser based at least in part on the first tab being visually rendered within the first window.

16. The apparatus of claim 11, wherein the instructions are further executable by the processor to cause the apparatus to:
receive, via a keyboard shortcut configured for the extension for the video conference application, a keyboard input to return to the first tab from the plurality of tabs; and
cause for display the first tab from the plurality of tabs based at least in part on receiving the keyboard input.

17. The apparatus of claim 11, wherein the instructions are further executable by the processor to cause the apparatus to:
determine that the video conference session of the video conference application has concluded; and
disable the visual marker associated with the first tab based at least in part on determining that the video conference session of the video conference application has concluded.

18. The apparatus of claim 11, wherein the instructions are further executable by the processor to cause the apparatus to:
receive a request to download the extension for the video conference application; and
install the extension for the video conference application in the web browser.

19. A non-transitory computer-readable medium storing code for web browser tab navigation, the code comprising instructions executable by a processor to:
initiate, via a web browser and in a first tab of a plurality of tabs of the web browser, a video conference session of a video conference application;
render a visual component in a user interface of the video conference session that indicates enablement of tab navigation functionality for the video conference application, the visual component indicating a first option to enable visual marking of the first tab, a second option to request a second web browser of a second attendee to visually distinguish a second tab that is actively hosting the video conference application within the second web browser, and a third option to disable visual marking of the first tab, wherein the enablement of the tab navigation functionality is based at least in part on an extension for the video conference application being installed in the web browser;
receive an input selecting the first option via the visual component to visually distinguish the first tab from the plurality of tabs for a duration of the video conference session; and cause for display the visual marker associated with the first tab for the duration of the video conference session based at least in part on receiving the input.

20. The non-transitory computer-readable medium of claim 19, wherein the instructions are further executable by the processor to:
receive a second input selecting the second option via the visual component to visually distinguish the second tab from a second plurality of tabs, wherein the second plurality of tabs corresponds to the second web browser of the second attendee of the video conference session; and
transmit a request to the second web browser of the second attendee to visually distinguish the second tab from the second plurality of tabs for the duration of the video conference session based at least in part on receiving the second input.

\* \* \* \* \*